R. S. TALLMAN.
Corn-Planters.
No. 152,434.　　　　　　　　　　Patented June 23, 1874.
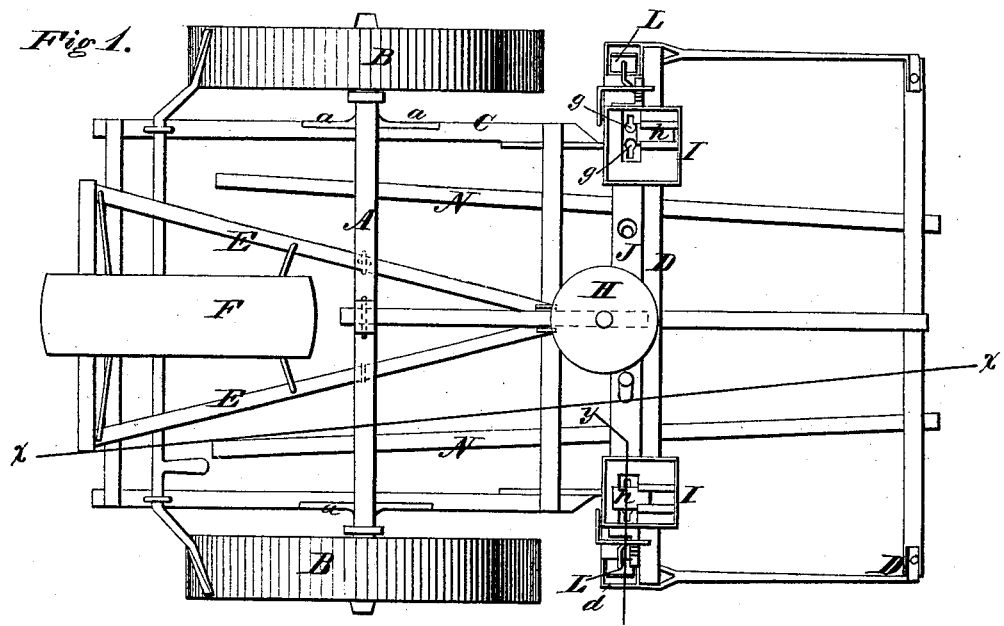
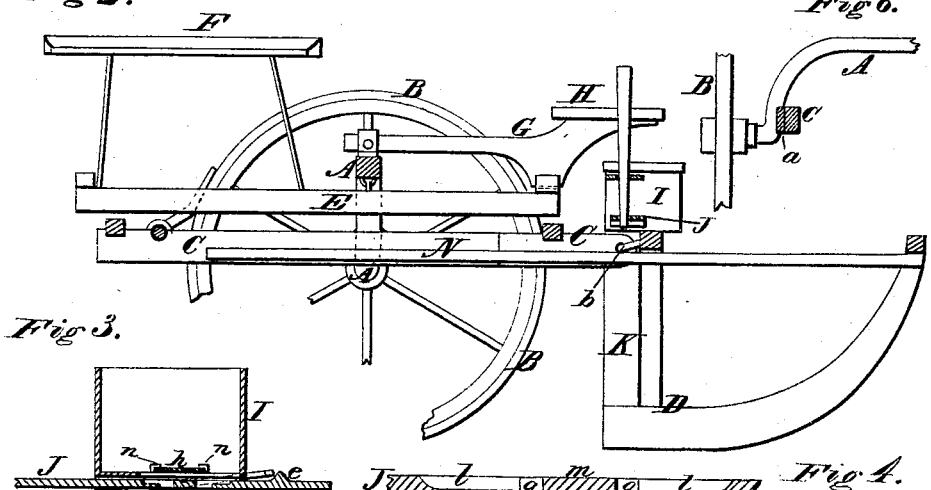
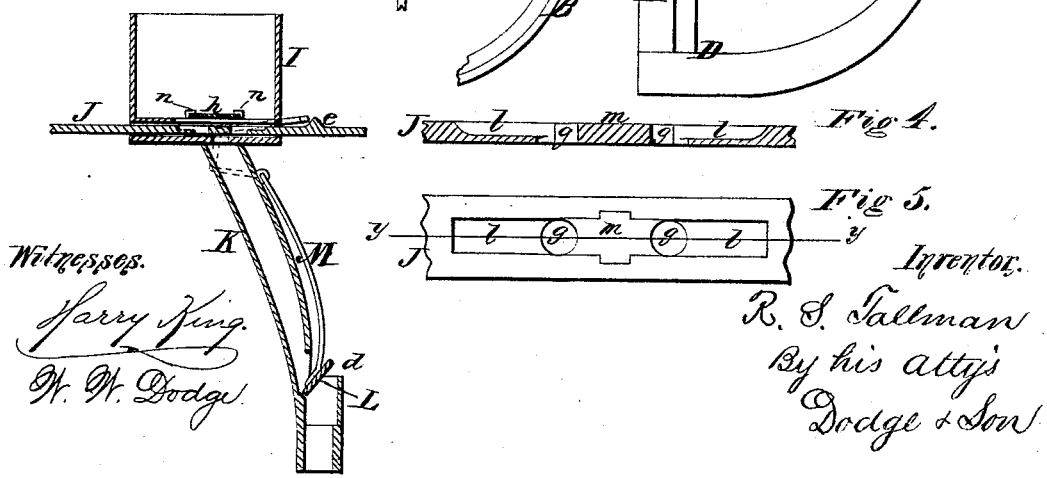
Witnesses.
Harry King.
W. W. Dodge.
Inventor.
R. S. Tallman
By his atty's
Dodge & Son

UNITED STATES PATENT OFFICE.

REUBEN S. TALLMAN, OF GRAND JUNCTION, IOWA.

IMPROVEMENT IN CORN-PLANTERS.

Specification forming part of Letters Patent No. 152,434, dated June 23, 1874; application filed May 2, 1873.

*To all whom it may concern:*

Be it known that I, REUBEN S. TALLMAN, of Grand Junction, in the county of Greene and State of Iowa, have invented certain Improvements in Corn-Planters, of which the following is a specification:

My invention relates to that class of double-row corn-planters in which the furrows are opened by runners, and the feed-slide operated by a boy riding on the front; and the invention consists in a novel manner of arranging the driver's and dropper's seats; in a peculiar arrangement of the seed hoppers and spouts; and in improvements in the feeding devices, as hereinafter described.

Figure 1 is a top plan view of my machine; Fig. 2, a longitudinal vertical section of the same on the line $x\ x$; Fig. 3, a vertical cross-section on the line $y\ y$; Fig. 4, a longitudinal vertical section through one end of the feed-slide; Fig. 5, a plan view of the same; Fig. 6, a front view of one end of the axle.

A represents the main axle, arched or curved upward at its middle, and provided, near each end, with a transverse flange or arm, $a$; B, the wheels, mounted on the ends of the axle; C, the rigid main frame, secured to the flanges $a$ of the axle; and D, the front or runner frame, hinged to the main frame, as usual. A light frame, E, is suspended from the axle, and provided, on its rear end, with a long driver's seat, F. A bar, G, is pivoted to the top of the axle, and has its front end provided with a dropper's seat, H, and arranged to bear on the front end of the frame E, as shown in Figs. 1 and 2. It will be seen that, under this arrangement, the weights of the driver and dropper are both supported on the frame E, and borne directly by the axle A. The driver, by moving forward and backward on his seat, can change his leverage on the dropper's seat, so as to allow any desired proportion of the dropper's weight to rest on the main frame, for the purpose of forcing the runners into the ground; or he can, when desirable, lift the dropper's weight from the frame entirely. By thus supporting both seats from the axle, and combining them so that the weights of the dropper and driver counterbalance each other, and so that the main frame can tilt independently of and without moving the seats, the machine is caused to run with great ease, all downward draft is taken from the horses' necks, and the driver is enabled to control the machine perfectly and easily. The machine is provided, as usual, with two seed-hoppers, I, a reciprocating feed-slide, J, and two conductors or spouts, K, to conduct the seed from the hoppers to the heels of the runners. The hoppers are set inward nearer the middle of the frame than usual, in order that the dropper and driver may see the heels of the runners, so as to drop the corn at the instant when the check-rows are crossed by the heels, and at the exact point desired. This arrangement of the hoppers renders it necessary to give the conductors or spouts K an inclination outward from the hoppers to the runners, as shown. In order that the dropper and driver may see at all times from their seats whether the machine is feeding properly, and whether the heels of the runners are freed from obstructions, each spout or conductor K is provided, on its outer side, with an opening, $d$, through which the interior of the tube and heel may be seen. The lower end of each spout is provided, as in all machines of this class, with a valve, L, to detain the corn until the check-row is reached. These valves are so shaped in my machine that the driver and dropper can see, through the openings $d$, the charge of corn behind them. By setting the hoppers inward, providing the spouts with the openings, and constructing the valves as described, the dropper and driver are both enabled to see the runner-heels and drop the corn at the exact points desired, to see the corn when deposited in the furrow, and when in the spouts, and to see whether or not there are obstructions in the runners. The valves L are attached to levers M, which are pivoted to the spouts, and operated by inclines $e$ on the feed-slide, as shown in Fig. 3. The feed-slide is operated by a hand-lever, and arranged to play through the hopper-bottoms, as usual. Each end of the slide is provided with two seed-cells, $g$, and each hopper provided with a stationary cut-off plate, $h$, above the slide, and directly over the discharge-opening into the spout, as usual, so that, as the slide moves to and fro, the two cells are filled, carried under the cut-off, and emptied alternately. In order to prevent the corn from being crushed or broken against the cut-off in case the cells are filled to excess, grooves *l* are cut in the top of the slide from each cell backward, as shown in Figs. 3, 4, and 5. Any excess of corn that may be wedged into the cells will slide back into the grooves, and thus the slide allowed to move with freedom and without danger of injuring the corn. In order that the amount of corn discharged may be increased and diminished, each end of the slide has that portion between the two cells removable, as shown at *m*, Figs. 4 and 5, so that it may be removed and replaced by a longer or shorter piece, so as to change the size of the cells. The removable block or piece will be so shaped that it cannot move endwise in the slide, the shape or form being immaterial so long as the block is held in place. In order to permit the ready removal and insertion of the blocks *m*, the cut-off is secured by flanges *n* in the hopper-bottom, so that it may be moved back from over the slide, as shown on the left hand in Fig. 1. The runner-frame may be, and generally is, provided with arms or levers N, extending backward, so that they may be operated by the driver's feet to tip the runners; but, if desired, these arms may be dispensed with.

Having thus described my invention, what I claim is—

1. The auxiliary tilting-frame E, supported directly by the main axle, entirely independent of the main frame and runners, and supporting the dropper's and driver's seats on opposite sides of the axle, as shown and described.

2. In a corn-planting machine, the combination of the dropper's and driver's seats, located as shown, with the seed-hoppers located inside of the line of the runners, and connected thereto by inclined spouts, as shown, so that both the dropper and the driver have a full view of the runner-heels at all times.

3. In a seed-planter, the outwardly-inclined spouts or conductors K, having the openings *d* in their outer sides, as and for the purpose described.

4. In combination with the seed-slide J, having the two seed-cells *g*, the detachable blocks *m*, inserted therein between the cells in such manner that it cannot move endwise, and serving to determine the size of both cells, as shown.

REUBEN SANFORD TALLMAN.

Witnesses:
C. B. PARK, Jr.,
W. R. PARK.